Merriam & Nichols,
Tool Rest,
N° 11,586. Patented Aug. 22, 1854.
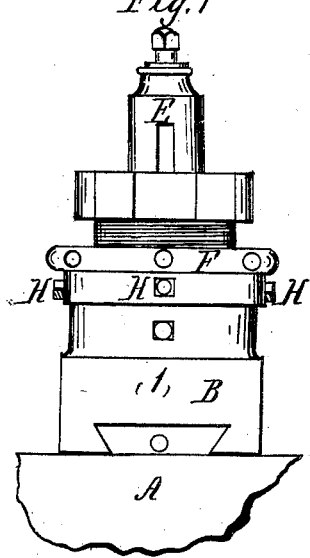
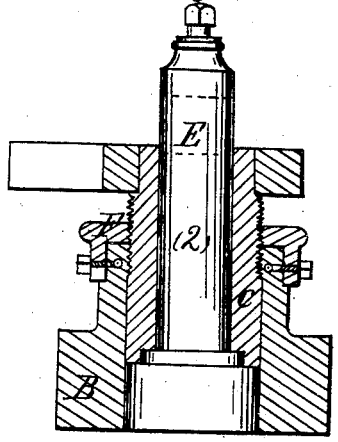
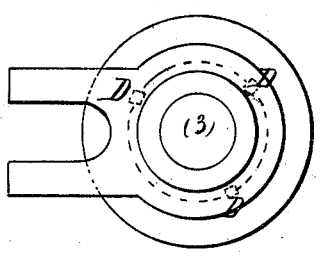
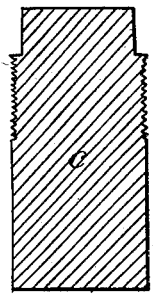

UNITED STATES PATENT OFFICE.

M. H. MERRIAM, OF CHELSEA, AND W. W. NICHOLS, OF BOSTON, MASSACHUSETTS, ASSIGNORS TO W. W. NICHOLS & CO.

TOOL-REST FOR TURNING-LATHES.

Specification of Letters Patent No. 11,586, dated August 22, 1854.

*To all whom it may concern:*

Be it known that we, M. H. MERRIAM, of Chelsea, and WM. W. NICHOLS, of Boston, in the county of Suffolk and State of Massachusetts, have invented a new and useful Improvement in Tool-Rests for Turning-Lathes; and we do hereby declare that the following is a full, clear, and exact description of the construction and operation of the same, reference being had to the annexed drawings, making a part of this specification, in which—

Figure 1 represents a front, elevation. Fig. 2, a longitudinal section. Fig. 3 is a plan. Fig. 4, represents a longitudinal section of the elevating screw, *c*.

Similar letters refer to similar parts.

A is the carriage surmounted by the slide B which is caused to traverse, the carriage by a screw in the usual way. The slide B has a boss, that is turned and bored for the purpose of receiving the elevating screw *c*. The slide B has channels cut vertically to receive the three gibs, D, D, D. At the bottom of the elevating screw, C, is a recess to receive the tool post E. At the upper end of the elevating screw, C, is attached a thick collar to support the tool when clamped upon it. The remaining part of the elevating screw C is turned to fit closely in the boss of the slide, B, and a fine screw thread is cut on the upper end of the same. In the sides of the elevating screw, C, are cut channels to receive the gibs D, D, D, corresponding to those cut in the side of the slide, B, permitting a vertical movement of the screw, C, but preventing a rotary movement of the same. Upon this elevating screw, C, is the nut, F, resting on the boss of the slide B and attached to the same by pins (or its equivalents) turned and fitted so as to run in a groove *o* cut in the slide B, by which the elevating screw C, is retained so that it cannot rise while the lathe is in operation. By this combination the nut when turned will elevate or lower the elevating screw, C, and tool post E, and the tool being attached to the same by a screw in the usual way will of course move up and down in the same manner. The gibs are secured in their places by the set screws, H, H, H.

The utility of the arrangement consists in the ability to raise the tool or lower the same without loosening the screw in the tool post, also, it can be done when the latter is in motion.

The novelty consists in attaching a tool post to an elevating screw so constructed and combined with the slide as to permit of a vertical movement thereof but preventing a rotary as described.

What we claim as our invention and desire to have secured by Letters Patent

1. Is the invention of the combination of the elevating screw C with the nut F and tool post E and slide B in which by turning the nut F you can elevate the tool post E and the elevating screw C and at the same time the elevating screw C is prevented from turning by the gibs D, D, D, as herein described.

2. We also claim the groove *o* in the slide B by which the tool post E elevating screw C and nut F are prevented from rising by pins or their (equivalent) fitted into the nut F and running in the groove *o* when the nut F is not turned but when the nut is turned the tool post can be lowered.

3. We claim the gibs D, D, D, and the elevating screw C as combined with and running in the channels of the slide B by which a vertical movement of the elevating screw C is produced and a rotary prevented as herein set forth.

M. H. MERRIAM.
W. W. NICHOLS.

Witnesses:
SUMNER ALBEE,
J. H. BUTCHE.